United States Patent [19]

Elias

[11] 3,928,789

[45] Dec. 23, 1975

[54] SWITCH INTERLOCK CIRCUIT

[75] Inventor: Jack Elias, Lansdale, Pa.

[73] Assignee: Honeywell Inc., Minneapolis, Minn.

[22] Filed: Sept. 13, 1973

[21] Appl. No.: 397,153

[52] U.S. Cl. .............................. 317/136; 340/365 S

[51] Int. Cl.[2] .......................................... G06F 3/02

[58] Field of Search ......... 317/134, 136; 340/365 S, 340/365 E

[56] References Cited

UNITED STATES PATENTS 3,771,130 11/1973 Moses ............................ 340/365 E

*Primary Examiner*—R. N. Envall, Jr.
*Assistant Examiner*—Harry E. Moose, Jr.
*Attorney, Agent, or Firm*—Arthur H. Swanson; Lockwood D. Burton; Mitchell J. Halista

[57] ABSTRACT

A switch interlock circuit having a plurality of selectively actuable switches supplies input signals to a priority encoder arranged to encode a selected one of the plurality of input signals into a binary coded output signal. The binary coded output signal is stored and is subsequently decoded by a decoder circuit to produce a single output line energization based a mutually decoding pattern to effect an energization of an output indicator and an output line representative of the selectively actuated switch.

8 Claims, 1 Drawing Figure

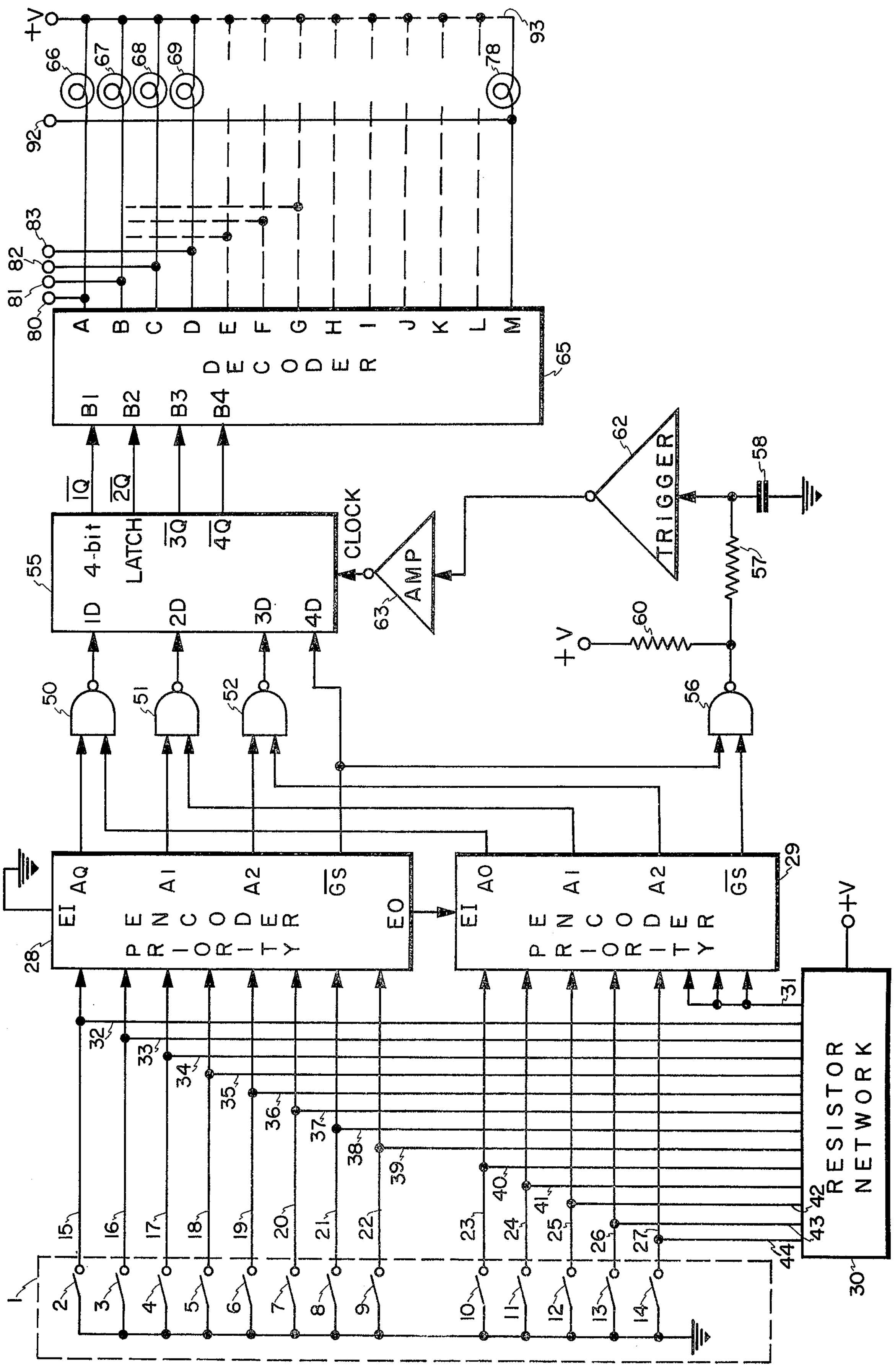
PRIORITY ENCODER
PRIORITY ENCODER
4-bit LATCH
DECODER
CLOCK
AMP
TRIGGER
RESISTOR NETWORK

SWITCH INTERLOCK CIRCUIT

BACKGROUND OF THE INVENTION

1. FIELD OF THE INVENTION

The present invention relates to switch control circuit. More specifically, the present invention is directed to a switch control circuit for electrically interlocking a plurality of separately actuable switches to provide a mutually exclusive output signal representative of a single actuated switch.

2. DESCRIPTION OF THE PRIOR ART

The increasing use of operator actuated keyboards in process control and other data handling application has given rise to an increase in the problem of preventing an erroneous keyboard actuation from affecting operating equipment controlled by the keyboard. Accordingly, it is desirable to provide a keyboard control circuit wherein an erroneous double key actuation will produce only a single, or mutually exclusive, output signal from a plurality of available output signals. While mechanical interlocks for keyboards are known in the prior art, as shown in U.S. Pat. No. 2,680,382, this interlock control of the keyboard should preferably be affected by electronic means to minimize any additional mechanical complexity of the keyboard and to provide virtually instantaneous response to a keyboard operation.

SUMMARY OF THE INVENTION

An object to the present invention is to provide an improved keyboard interlock circuit for preventing spurious operation of the keyboard by restricting the keyboard output signal to a single mutually exclusive signal.

Another object of the present invention is to provide an improved keyboard interlock circuit having electronic means for detecting the operation of the keyboard and for providing a single mutually exclusive output signal.

In accomplishing these and other objectives, there has been provided, in accordance with the present invention, a keyboard interlock circuit using a priority encoder circuit for providing a coded output signal representative of the actuation of a switch in the keyboard. The priority encoder output signal is representative of the operation of a keyboard switch having the highest priority among any input signals applied concurrently to the priority encoder. The coded output signal is stored and is subsequently decoded by a decoder to provide a single mutually exclusive output line energization signal in response to the coded signal. The output line energization signal is applied to a selected one of a plurality of output lines from the decoder and is used to energize an output indicator and to provide an output signal suitable for use in equipment responsive to the operation of the keyboard.

DESCRIPTION OF THE DRAWINGS

A better understanding of the present invention may be had when the following detailed description is read in connection with the accompanying drawing in which the single FIGURE is a block diagram of a keyboard interlock circuit embodying the present invention.

DESCRIPTION OF THE PREFERRED EMBODIMENT DETAILED DESCRIPTION

Referring to the single figure drawing in more detail, there is shown a keyboard interlock circuit for controlling the operation of a thirteen key, or switch, keyboard 1. The keyboard 1 is shown in exemplary form as having thirteen separately actuable switches 2 to 14 therein. Each of the switches 2 to 14 is connected between a common ground line and a corresponding one of a plurality of output lines 15 to 27. The output lines 15 to 27 are, in turn, connected to respective ones of a plurality of input circuits of a pair of priority encoders 28 and 29. The priority encoders 28 and 29 may be any suitable device capable of accepting one or more input signals and providing an output signal in binary coded digital form representative of the highest priority input signal among the input signals applied to the encoder. Such an encoder is well known in the prior art and may be of the type manufactured by the Texas Instrument Company of Dallas, Texas and sold under the designation of Solid State Circuit No. 74148/9318.

Each of the keyboard output lines 15 and 27 are, also, connected to respective output circuits of a resistor network 30 arranged to supply separate output signals derived from a source +V on each of a plurality of output lines 31 to 44. Thirteen of the output lines 32 to 44 from the resistor network 30 are each connected to a corresponding one of the output lines 15 to 27 from the keyboard 1. For example, a second output line 32 from the resistor network 30 is connected to a first output line 15 of the keyboard 1. The output signal from the resistor network 30 on each of the output lines 32 to 44 is arranged to be a high level signal until a switch in the keyboard 1 is selectively actuated. As a result, a high level signal is normally applied to each of the input circuits of the encoders 28 and 29. When a switch in the keyboard 1 is actuated the output line from the keyboard 1 corresponding to the selectively actuated switch in the keyboard 1 is connected to the ground line 15. As a result the output line from the keyboard 1 connected to the actuated switch is at a low signal state.

Since each of the aforesaid commercially available priority encoders have only eight input circuits, the embodiment of the invention shown in the drawing uses two of such encoders to accommodate the thirteen switch keyboard. Such an arrangement results in a surplus of three input circuits in one of the encoders. Accordingly, these three surplus input circuits are permanently connected to a single otherwise unused output line of the resistor network 30, i.e., first output line 31, to maintain a high level input signal on these three surplus input circuits to prevent the encoder having the surplus input circuits, i.e., encoder 29, from producing a coded output signal representative of any one of the surplus input circuits. Each of the encoders 28 and 29 is arranged to produce an output signal representative of the highest priority input signal as a three bit binary code on a plurality of output lines A0, A1 and A2. Similar ones of the coded output lines A0, A1 and A2 from the encoders 28 and 29 are connected to respective inputs of a plurality of two-input NAND gates. Specifically, output lines A0 from the encoders 28 and 29 are connected to a first NAND gate 50. Similarly, output lines A1 from the encoders 28 and 29 are connected to a second NAND gate 51 and output lines A2 are connected to a third NAND gate 52.

The output signals from the NAND gates 50 to 52 are applied to respective ones of three of the inputs of a four-bit latch circuit 55. The latch circuit may be any suitable circuit for receiving and storing input signals applied thereto and may be one identified as Solid State Circuit No. 74175 also manufactured by the aforesaid Texas Instruments Co. Specifically, the output signal from the first NAND gate 50 is applied to a first input circuit 1D of the latch 55 while the output signal from the second and third NAND gates 51 and 52 are applied to the second and third input 2D and 3D of the latch 55, respectively. The encoders 28 and 29 are arranged to also produce two other output signals, identified in the drawing as $\overline{GS}$ and $\overline{EO}$. The $\overline{GS}$ signal is a logical negative of a group select signal representing the condition, or state, of all the input signals to an encoder. Thus, all of the input signals to the encoder are sensed and if any of them changes state, i.e., high to low, then the $\overline{GS}$ output signal changes state. Accordingly, the $\overline{GS}$ output signal is applied to a fourth input 4D of the latch 55 and is used as a fourth digital bit for a coded representation of an actuated switch on the keyboard 1. In the illustrated embodiment, the GS output signal from one of the encoders 28 and 29, e.g., encoder 28 is used along with the three digital bits representing the encoded representation of the actuated switch input signal in order to differentiate between the two encoders 28 and 29. In other words, since the coded representation for corresponding ones of the eight input signals to the encoders 28 and 29 is the same binary code, the fourth bit from the $\overline{GS}$ output signal is used to select between the encoders 28 and 29. For example, if a keyboard switch connected to the first encoder 28 is actuated along with a keyboard switch connected to the second encoder 29, the $\overline{GS}$ output signal from the first encoder 28 is used to produce a four bit digital code representative of the keyboard switch connected to the first encoder 28. In order to further interlock the encoders 28 and 29, the $\overline{EO}$ output signal from the first encoder 28 is applied to the $\overline{EI}$ input of the second encoder 29 to act as a "strobe" signal for the second encoder 29. Thus, if any of the input signals to the first encoder 28 are "low," the $\overline{EO}$ output from the first encoder 28 is arranged to inhibit the coded output signals from the output A0, A1 and A2 from the second encoder 29. Concurrenntly, the $\overline{EI}$ input of the first encoder 28 is connected to a ground connection to provide a non-inhibit effect on the output signals from the first encoder 28. The $\overline{GS}$ output of the encoder 28 is also applied to a first input of a fourth NAND gate 56 having a second input thereof connected to the $\overline{GS}$ output circuit of the second encoder 29.

The output from the fourth NAND gate 56 is connected to a signal filtering circuit including an RC network of a resistor 57 and a capacitor 58. Further, the output circuit of the fourth NAND gate 56 is connected through a resistor 60 to a source +V. The signal stored in the capacitor 58 is applied to the input circuit of an astable multivibrator trigger circuit 62. The output signal from the trigger circuit 62 may either be used directly or may be applied to the input circuit of an amplifier and inverter circuit 63 which is used only if needed to obtain the proper logical polarity for a clock signal to operate the latch 55. In either case, the trigger circuit output signal is ultimtely applied to the clock input of the latch 55 to effect a storage of the four-bit coded representation of an actuated keyboard switch signal in the latch 55.

The output signal from the latch 55 is obtained on a plurality of output lines $\overline{1Q}$, $\overline{2Q}$, $\overline{3Q}$ and $\overline{4Q}$. These output lines are connected to respective input circuits B1, B2, B3 and B4 of a decoder circuit 65. The decoder circuit 65 may be any well-known decoder circuit, such as that identified as a Texas Instrument Co. Solid State Circuit No. 74154, capable of decoding the binary coded four bit input signal applied thereto an energization of a corresponding one of a plurality of output lines whereby an exclusive energization of one of the output lines is obtained. A plurality of output lines A, B. C, . . .M from the decoder 65 are each connected to a respective one of a plurality of indicating devices, i.e., lamps 66, 67, . . .78. The other side of the indicating lights 66 to 78 are connected to a common return line 93 connected to the source +V. Additionally, each of the output lines A, B. C, . . .M from the decoder 65 are connected to a corresponding one of a plurality of output terminals 80, 81, . . .92.

MODE OF OPERATION

The circuit of the present invention is arranged to electronically interlock the switches 2 to 14 in the keyboard 1 to insure that only one switch is effective at any one time to produce an output signal and an indication as represented by an energization of one of the lamps 66 to 78. Upon the application of at least one "low" input signal to the priority encoders 28 and 29 corresponding to the operation of one of the keyboard switches 2 to 14, by an operator a binary coded output signal is produced on the three output lines A0, A1 and A2 of the encoders 28 and 29. The encoders 28 and 29, as previously mentioned, are arranged to produce a binary coded digital output signal corresponding to the input signal having the highest priority of the input signals applied thereto from the keyboard 1. In other words, a priority, or weight, is assigned to each of the switches 2 to 14 in the keyboard 1 by the encoders 28 and 29 whereby when two or more input signals are simultaneously received by the encoders 28 and 29 corresponding to an erroneous operation of the keyboard 1 by an operator, the input signal with the highest priority is represented by the coded digital output signals from the outputs A0, A1 and A2. As previously explained, the group select signal $\overline{GS}$ from the encoders 28 and 29 is also "low" when any of the "low" input signals to the same encoder is present.

The coded output signals from the encoder 28 and 29 are summed in the respective NAND gates 50, 51, and 52 to produce NAND gate output signals which are applied to corresponding inputs of the latch circuit 55. The formation of these output signals by the NAND gates 50, 51, and 52 enables the output signals from either of the encoders 28 and 29 to be applied to the inputs of the latch 55. As previously mentioned, the $\overline{EO}$ output of the first encoder 28 is arranged to inhibit the operation of the second encoder 29 of an input signal is applied concurrently to the first and second encoders 28 and 29. Further, the $\overline{GS}$ signal from the first encoder 28 is also applied to a separate input of the latch 55 to further differentiate the stored code in the latch 55 between the first and second encoders 28 and 29. The latch circuit 55 is arranged to store the four bit code ultimately applied thereto which code is representative of an actuated keyboard switch having the highest priority as determined by the encoders 28 and 29, for a period of time after the keyboard switch has been released by the operator.

The storing operation of the latch circuit 55 is controlled by the clock signal applied thereto which clock signal is generated by the $\overline{GS}$ output signal from either of the encoders 28 and 29. Specifically, the $\overline{GS}$ output signals from the encoders 28 and 29 are summed in a fourth NAND gate 56 to produce a NAND gate output signal which is used to energize a multivibrator trigger circuit 62. A positive going edge of the output signal from the trigger circuit 62 is arranged to energize the latch 55 to initiate the storing operation of the coded input signals applied thereto. The generation of the clock signal by means of the trigger circuit 62 is effective to eliminate keyboard switch contact bounce errors, while the storage of the coded signal from the encoders 28 and 29 in the latch 55 is effective to provide a memory for the actuated switch code after the keyboard switch has been released by the operator.

The stored coded signal in the latch 55 is applied to the decoder 65 to be decoded by the decoder 65 into an energization of one out of thirteen mutually exclusive output lines A to M. This energization of one of the thirteen output lines A to M from the decoder 65 is, accordingly, representative of the actuation of one of the thirteen switches 2 to 14 on the keyboard 1. The energization signal on the selected one of the thirteen output lines from the decoder 65 is applied to a corresponding one of thirteen indicating lights 66 to 78 to provide a visible indication of the actuated switch on the keyboard 1 and to a corresponding one of a plurality of output lines 80 to 92 to provide an output signal from the keyboard 1 suitable for use in associated equipment. This energization of the indicating light and the output line is maintained until a subsequent switch on the keyboard 1 is operated by the operator whereupon the energization of an indicating light of the lights 66 to 78 and an application of an output signal on the lines 80 to 92 is changed to correspond to the new switch actuation.

Accordingly, it may be seen that there has been provided, in accordance with the present invention, a keyboard interlock circuit for preventing spurious operation of a keyboard by restricting the keyboard output signal to a single mutually exclusive signal.

The embodiments of the invention in which an exclusive property or privilege is claimed are defined as follows:

1. A keyboard interlock circuit comprising:

a keyboard having a plurality of manually actuable switches, supply means connected to said switches to provide a separate switch output signal from each of said switches with each switch output signal being representative of an actuation of a respective one of said switches, encoding means connected to said switches for coding each of said output signals from said switches to a respective coded representation thereof, said encoding means including priority determining means for restricting said coded representation from said encoding means to represent a switch output signal having the highest priority among concurrently applied switch output signals from said switches to said encoding means, means for decoding said coded representation from said encoding means into an energization of a mutually exclusive one of a plurality of output lines from said means for decoding, and output means connected to said output lines to respond to a selective energization of said output lines by said means for decoding.

2. A keyboard interlock circuit as set forth in claim 1 and including means for storing said coded representation from said encoding means in response to a clock signal representative of an encoding operation by said encoding means.

3. A keyboard interlock circuit as set forth in claim 2 wherein said means for encoding includes clock signal generating means responsive to the generation of said coded representation by said means for encoding to produce a clock signal for storing said output signal in said means for storing.

4. A keyboard interlock circuit as set forth in claim 3 wherein said output means includes a plurality of indicating means with each of said indicating means being connected to a respective one of said plurality of output lines from said means for decoding.

5. A switch interlock circuit as set forth in claim 4 wherein said coded representation from said means for encoding is a binary coded digital signal.

6. A switch interlock circuit as set forth in claim 5 wherein said output means includes a plurality of output terminals with each of said output terminals being connected to a respective one of said output lines from said means for decoding.

7. A switch interlock circuit as set forth in claim 6 wherein said binary coded digital signal is a three bit binary coded signal.

8. A switch interlock circuit as set forth in claim 7 wherein said clock generating includes an astable multivibrator trigger circuit and means for applying an input signal to said trigger circuit representative of the application of an input signal from said supply means to said encoder means.

* * * * *